(12) United States Patent  (10) Patent No.: US 6,729,551 B2
Lyons et al.  (45) Date of Patent: May 4, 2004

(54) FIREPLACE MAKE-UP AIR HEAT EXCHANGE SYSTEM

(75) Inventors: David Charles Lyons, Red Wing, MN (US); Richard Donald Berg, Lakeville, MN (US); Robb Edward Bennett, Prior Lake, MN (US)

(73) Assignee: HON Technology Inc., Muscatine, IA (US)

( * ) Notice: Subject to any disclaimer, the term of this patent is extended or adjusted under 35 U.S.C. 154(b) by 0 days.

(21) Appl. No.: 10/371,761

(22) Filed: Feb. 24, 2003

(65) Prior Publication Data

US 2003/0127529 A1 Jul. 10, 2003

Related U.S. Application Data

(62) Division of application No. 09/546,138, filed on Apr. 10, 2000, now Pat. No. 6,543,698.

(51) Int. Cl.[7] ................................................. F24B 7/00
(52) U.S. Cl. ........................... 237/55; 237/50; 126/512
(58) Field of Search ............................. 237/55, 53, 50; 126/512, 523, 528, 529, 530

(56) References Cited

U.S. PATENT DOCUMENTS

| | | | | |
|---|---|---|---|---|
| 2,834,619 A | * | 5/1958 | Glover | 277/317 |
| 3,999,710 A | * | 12/1976 | Kemmerer | 237/53 |
| 4,130,105 A | * | 12/1978 | Melton | 126/110 R |
| 4,141,336 A | * | 2/1979 | Fitch | 126/121 |
| 4,270,513 A | * | 6/1981 | Mitchelson | 126/120 |
| 4,278,126 A | * | 7/1981 | Skrzypek | 165/122 |
| 4,319,557 A | * | 3/1982 | Sietmann et al. | 126/110 R |
| 4,379,447 A | * | 4/1983 | Schott et al. | 126/117 |
| 4,773,589 A | * | 9/1988 | Boyd | 126/504 |
| 4,928,667 A | * | 5/1990 | Shaw | 126/512 |
| 5,046,481 A | * | 9/1991 | Warwick | 126/522 |
| 5,267,552 A | * | 12/1993 | Squires et al. | 126/512 |
| 5,497,761 A | * | 3/1996 | Mayr | 126/523 |
| 5,983,890 A | * | 11/1999 | Thomas et al. | 126/512 |
| 6,019,099 A | * | 2/2000 | Shimek et al. | 126/512 |
| 6,053,165 A | * | 4/2000 | Butler et al. | 126/512 |
| 6,145,502 A | * | 11/2000 | Lyons et al. | 126/512 |

* cited by examiner

*Primary Examiner*—Derek Boles
(74) *Attorney, Agent, or Firm*—Merchant & Gould PC

(57) ABSTRACT

The need to maintain the quality of air in a home has become more of a problem in new high efficiency tight houses so that governmental regulations are being proposed for a minimum change of fresh air. If too much cold outside fresh air is introduced into such homes at a single source, the room with the fresh air is usually too cold and/or unbalanced.

The present invention avoids cooling any one room while maintaining heat efficiency. When the home has a gas fireplace, the exhaust gases are preferably directed through an air-to-air cross flow heat exchanger which preheats the quality air passing into a forced air furnace system.

In modified embodiments of the present invention, make-up quality air is mixed with the room air and heated in the heat exchanger of the fireplace. The preheated room air from the fireplace is preferably connected to the supply/return of a forced air furnace system and distributed to all rooms to provide uniform heating.

11 Claims, 6 Drawing Sheets

FIREPLACE MAKE-UP AIR HEAT EXCHANGE SYSTEM

This is a divisional application of application Ser. No. 09/546,138 filed Apr. 10, 2000 now U.S. Pat. No. 6,543,698 for a Fireplace Make-Up Air Quality Heat Exchange System.

BACKGROUND OF THE INVENTION

1. Field of the Invention

The present invention relates to prefabricated fireplaces that provide both radiant heat and convection heat. More particularly, the present invention relates to using heat from a fireplace to mix with cold outside fresh air or to preheat outside fresh air used to raise the air quality in a home.

2. Description of the Prior Art

It is known that it is possible to build heat efficient houses so tight that the air inside of a home becomes stale. There is no universal standard in all states which defines the minimum amount of outside make-up air required to maintain the indoor air quality.

The State of Minnesota has proposed that the air in a heated house be replaced every two hours. Minnesota has also proposed that a minimum of a set amount of cubic feet of outside air for each bedroom plus another set amount of air for the remainder of a house be replaced every hour. At present, all known proposed standards leave the solution to builders of custom equipment.

Heretofore, it was known that an auxiliary air pump could be installed in an old house to pull in a predetermined amount of outside fresh air to make-up or refresh the stale air in a home. Large custom air conditioning systems, if properly designed, introduce into the air conditioning system a small percentage of fresh air, however, there is no standard and the equipment is not mass-produced, thus, imposing a substantial cost to new home builders.

It would be desirable to incorporate an air make-up or air quality replacement system into present mass produced, low cost, prefabricated fireplaces and combination fireplaces/forced air furnace systems and still maintain high efficiency.

SUMMARY OF THE INVENTION

It is a principal object of the present invention to introduce into a fireplace/furnace system outside fresh make-up air in a manner that does not unbalance the heating system.

It is a principal object of the present invention to mix outside fresh air into a return air duct or ducts and add the convection heat from a fireplace into the same return air duct.

It is a principal object of the present invention to introduce a predetermined amount of make-up air into a fireplace to produce heated and diluted exhaust air products that are then used in an efficient heat exchanger to preheat fresh outside make-up air being supplied to a return air plenum.

It is a principal object of the present invention to provide an efficient co-linear fireplace system having hot exhaust gases that are passed through a novel remotely located heat exchanger system for preheating outside make-up air being supplied to a return air plenum of a quality air system.

It is a principal object of the present invention to provide a novel air-to-air heat exchanger having a pair of separately controlled blower motors for universal use in fireplace/furnace duct systems to supply variable amounts of make-up air in an air quality system.

According to these and other objects of the present invention, there is provided a fireplace with a heat exchanger exhaust system for heating or preheating outside fresh air that is then introduced into return air ducts of a forced air furnace system.

DESCRIPTION OF THE PREFERRED EMBODIMENTS

Figure 1:
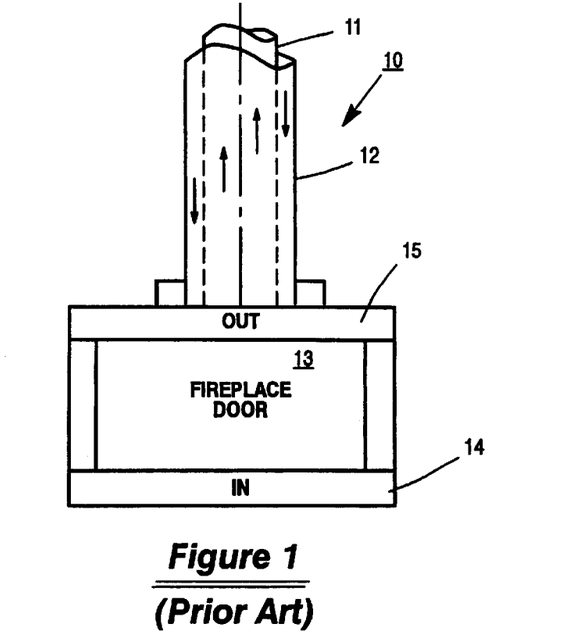
FIG. 1 is a diagrammatic drawing in front elevation of a prior art direct vent fireplace with a convection heat exchanger.

Refer now to FIG. 1 showing a top direct vented fireplace 10 of the type having a coaxial pipe comprising an exhaust pipe 11 and a fresh intake air pipe 12. The fresh outside air is burned in the center of the fireplace 10 in combustion chamber 13 and subsequently exhausted back out the center exhaust pipe 11 so that no inside air is required for the combustion products. Such gas fireplaces are sold by Heat and Glow Fireplace Products, Inc. of Lakeville, Minn. under Model Number 600DVT. Such fireplaces are provided with a heat exchanger which passes under the combustion chamber around the back of the combustion chamber and comes out at the top to provide an efficient convection and radiant heating system. The intake for the heat exchanger is shown at numeral 14 and the outlet of the heat exchanger is shown at numeral 15.

Figure 2:
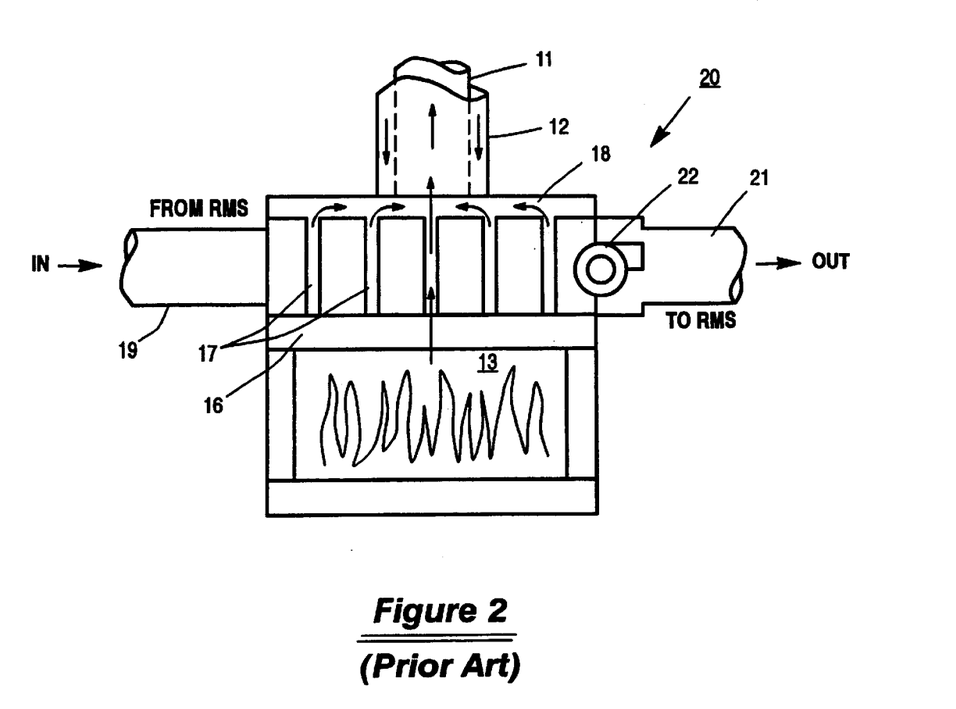
FIG. 2 is a diagrammatic drawing in front elevation of a prior art direct vent fireplace with a fire tube air heat exchanger and a high-speed blower.

Refer now to FIG. 2 showing a front elevation of a direct vent fireplace 20 having an air intake pipe 12 and an exhaust pipe 11. The combustion gases produced in the combustion chamber 13 are passed into a plenum 16 which connects to fire tubes 17 which exits into an upper plenum 18 and then passes out through the exhaust stack 11. To create a heat exchanger, a supply duct from the room(s) 19 is connected to the heat exchanger box and the air is heated by the hot fire tubes 17 and exits into the hot air return duct 21 with the assistance of an induced/forced draft fan or blower which, by nature of its operation and location, is noisy.

It has been found that consumers who buy prefabricated fireplaces will tolerate low speed quiet blowers in the heat exchangers of the system shown in FIG. 1, but are not quite as tolerant of a noisy high speed blower of the type shown in the prior art fireplace of FIG. 2. Another disadvantage of the FIG. 2 embodiment is that the heat exchanger system is mounted on top of the fireplace 20 and often makes the mantel or top shelf of the fireplace inordinately high and unattractive if it is provided.

Figure 3:
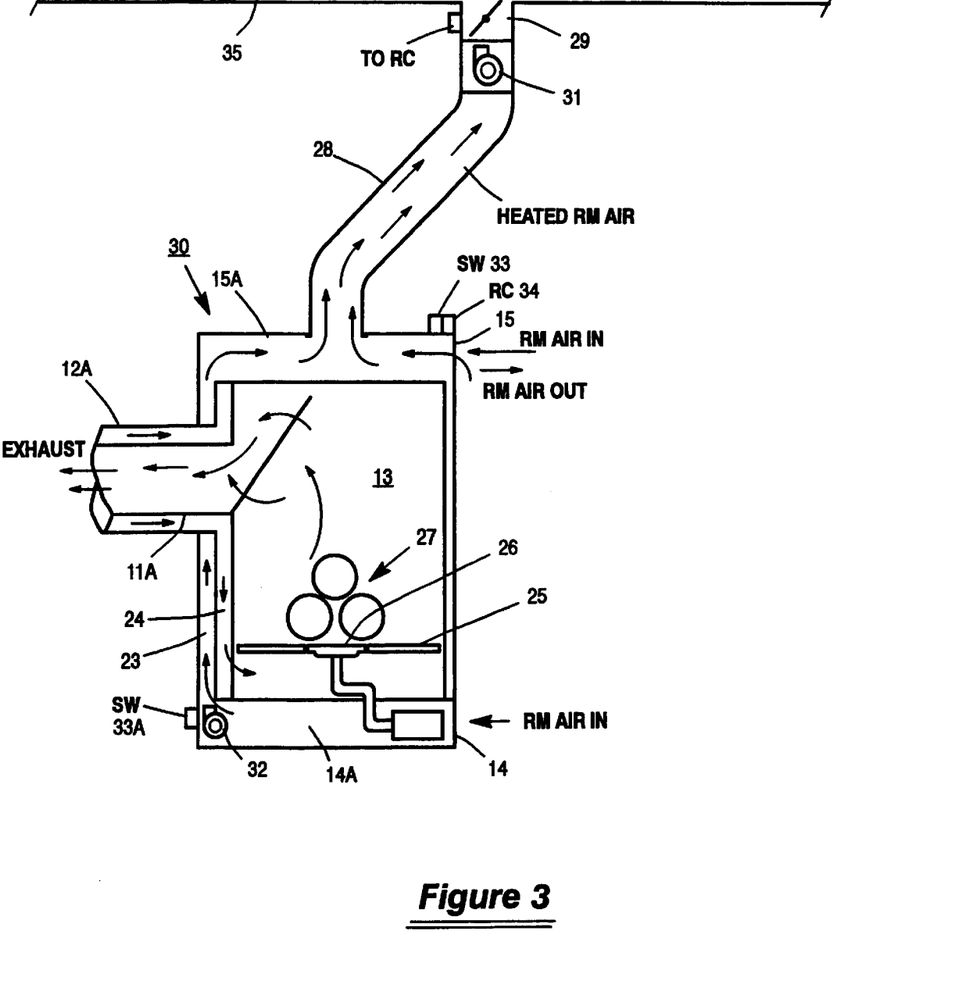
FIG. 3 is a diagrammatic drawing in side elevation of a direct vent fireplace adapted to deliver heat from its heat exchanger to a duct or ducts of a central heating system for distribution to all rooms in a house.

Refer now to FIG. 3 showing a direct vent fireplace 30 adapted to deliver heat from its heat exchanger to a supply duct or return duct of a central heating system for distribution to all rooms or specific rooms in a house. The fireplace 30 is shown comprising an inlet 12A for supplying fresh air into fresh air passage 24 which extends under floor 25 at burner 26 for burning gases in combustion chamber 13 which surround logs 27. In the preferred embodiment, the intake air passage 14 and lower passageway 14A connect into rear heat exchanger passage 23 which connects into upper passageway 15A for supplying heated room air out of the outlet 15.

However, when the system is employed to deliver hot air into diversionary duct 28, damper 29 is opened and hot air can be supplied to the return duct 35. In the preferred embodiment of the present invention, when heated room air is being supplied via duct 28 into duct 35 the blower motor 32 is not enabled or activated because the return air duct is capable of pulling the air to the central heating system not shown. In the event that the closest duct 35 available is a supply duct, it is necessary to force the air into the supply duct using a forced draft fan 31.

The advantage of fireplace 30 is that the blower motor 32 is a very quiet low speed motor and is only used when fireplace 30 is used in its conventional mode to take air in inlet 14 and exhaust heated air out outlet 15. In all other modes, the motor 32 may be disabled by switches 33 or 33A. As an alternative, it is possible to connect duct 28 to a direct duct which exits into a remote room having an induced draft fan which is actuated by controller 34. The controller 34 may actuate the remote controller RC and used to actuate the damper 29.

Figure 4:
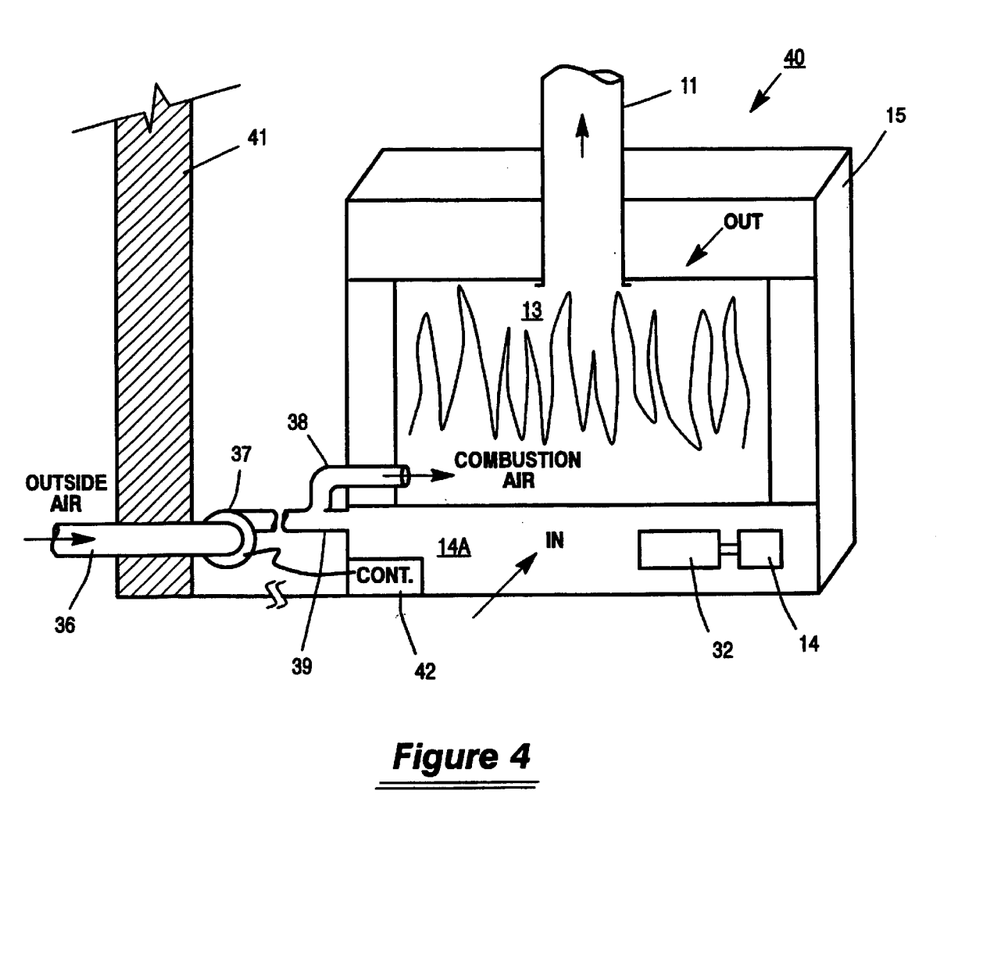
FIG. 4 is a diagrammatic drawing in front elevation of a co-linear fireplace having a quiet blower in its heat exchanger and a remote blower for supplying outside fresh air for combustion as well as excess fresh air to the heat exchanger for supplying fresh make-up air in conformance with new air quality standards.

Refer now to FIG. 4 showing a co-linear fireplace 40 having a conventional heat exchanger where the inlets and outlets 14 and 15 are shown and are connected by a passageway like passageway 23 in the rear of the combustion chamber 13. In this embodiment, a remote blower 37 is shown having an intake pipe 36 connected to an outside source of fresh air which is pumped into the fireplace 40. The necessary amount of combustion air is supplied by supply pipe 38 and the remainder of the outside fresh air which comprises the make-up air is supplied into the heat exchanger by branch 39. Thus, the outside fresh air being forced into the heating system is preheated by the heat exchanger and supplied directly into the same room with the heat exchanger. When the fireplace 40 is of sufficient capacity, all of the outside air is heated above room temperature so that the system operates efficiently to preheat the make-up air as well as supply diluted heated room air to the room in which the fireplace 40 is located. In this embodiment, a control 42 in fireplace 40 operates the remote blower motor 37 at a predetermined speed to supply the necessary make-up air into the chamber shown at inlet 14, 14A.

Figure 5:
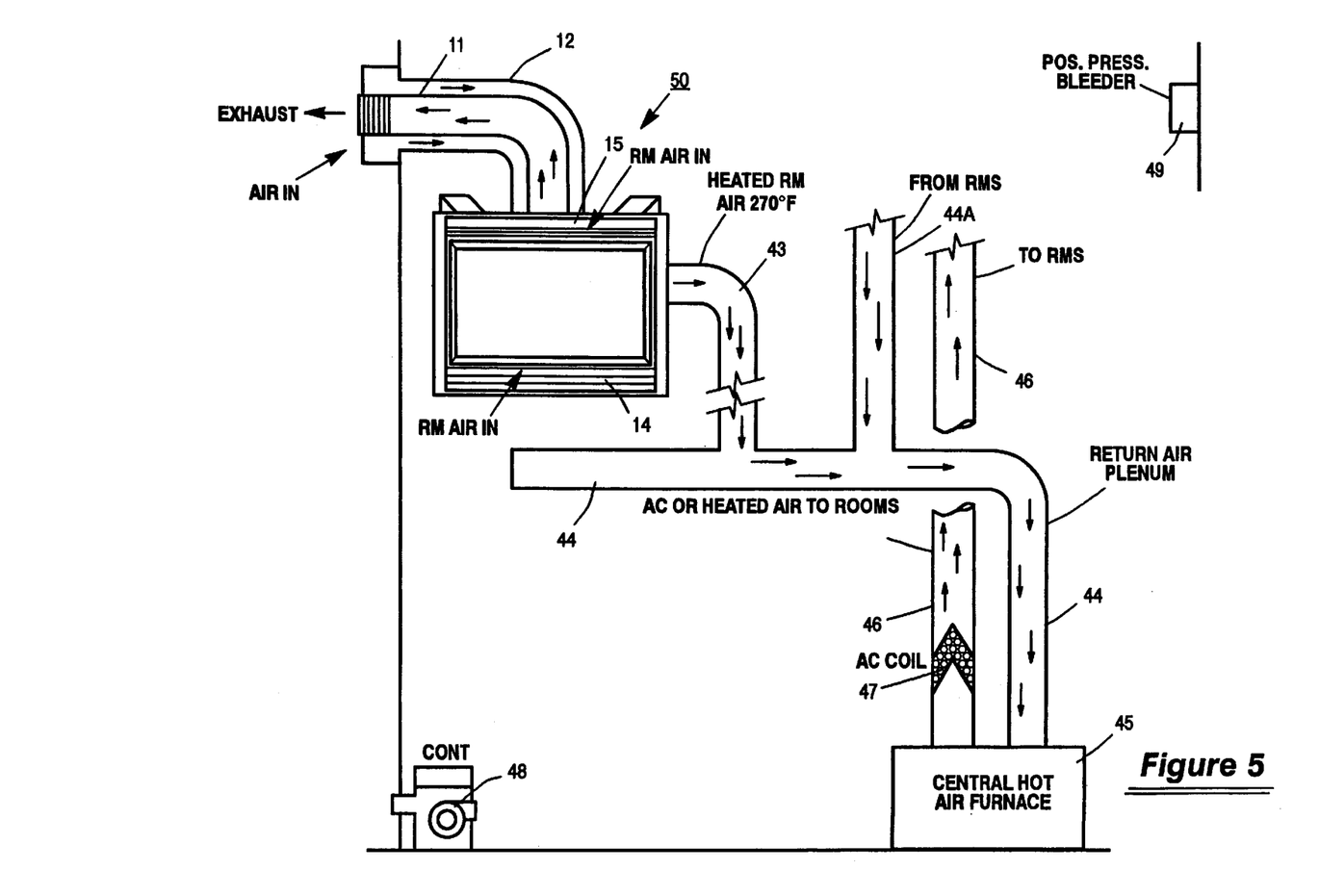
FIG. 5 is a diagrammatic drawing in elevation of a fireplace adapted to heat room air in its heat exchanger and to deliver the heated air into the return air duct of a central heating system and is shown having a remote air pump for supplying a predetermined amount of fresh make-up air to the house.

Refer now to FIG. 5 showing a direct vent fireplace 50 having a diversionary supply duct 43 which connects into the heat exchanger of the fireplace 50. The duct 43 supplies room air at approximately 270 degrees Fahrenheit to the return air plenum or return duct 44 which terminates at the central hot air furnace 45. The furnace 45 is provided with a blower (not shown) and heats the air received and supplies it in the supply duct 46 to the rooms to be heated. An air conditioning coil 47 is shown connected into the supply duct 46, but is not used during the heat season. After supplying the heated air to the rooms, the individual return ducts from the rooms are connected back into the return air plenum 44 and since there is a negative pressure provided at the central heating system 45 no additional fan is needed to pull this return air back to the central air furnace. The furnace blower is preferably on when fireplace 50 is on.

In order to supply the necessary make-up air or quality replacement air for the home, a remote air pump 48 is shown connected to an outside source of fresh air. In the preferred embodiment, the remote air pump 48 is located in a basement area. Basement air and the fresh air enter the return 44 and do not overly cool any particular isolated room. In this embodiment, the fresh air in a tight home is circulated through the duct system to the individual rooms and is preheated with the air in the return duct 44. Further, the outside fresh air that is passed into the room in which the fireplace 50 is located passes through the heat exchanger 14, 15 and is heated before it passes into duct 44 and the return air plenum duct 44. Since the remote air pump 48 can produce a positive pressure in a tightly sealed house, it is preferred that a bleeder 49 be located at an area completely remote from the air pump to relieve this positive pressure inside of the house.

Figure 6:
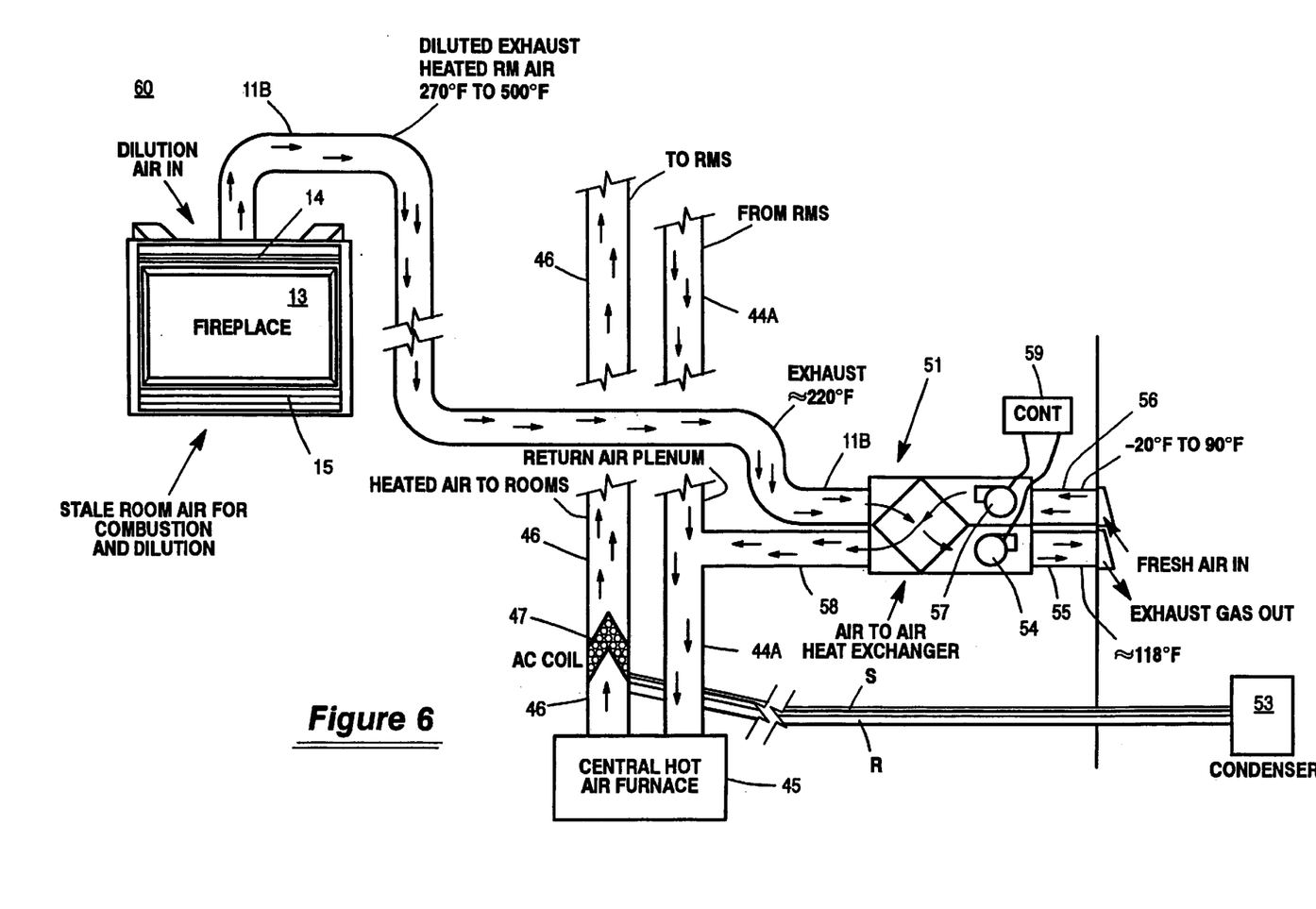
FIG. 6 is a diagrammatic drawing in elevation of a draft-assisted or power-vented fireplace adapted to use room air for combustion and to dilute the exhaust gases.

Refer now to FIG. 6 showing a diagrammatic drawing in elevation of a draft assist or power vent fireplace 60 adapted to use room air for combustion and for dilution of exhaust gases which in turn are passed through a novel heat exchanger. The fireplace 60, like fireplace 30, has a heat exchanger with two inlets 14 and 15. The bottom grill 15 supplies stale room air for combustion in combustion chamber 13 as well as dilution of the exhaust gases. The inlet 14 supplies room air for dilution of the mixed exhaust gases which pass into the exhaust duct 11B at approximately 270 to 500 degrees Fahrenheit, depending on the amount of excess combustion air and dilution supplied in inlets 14 and 15. As will be explained later, this amount of dilution may be controlled in a tight house. The exhaust gases in exhaust duct 11B are cooled to approximately no more than 220 degrees Fahrenheit before being passed into a novel cross flow air-to-air heat exchanger 51. The arrows in the heat exchanger show the exhaust gases pass diagonally downward into in-line blower 54 and force the cooled exhaust gases out of duct 55 at approximately 118 degrees Fahrenheit. There is shown a fresh air intake duct for outside air 56 supplying air into the heat exchanger 51 via in-line blower 57 which forces the preheated outside air into duct 58 which is connected to the aforementioned plenum 44A that serves as the supply to the central hot air furnace 45. The furnace 45 has its own blower and heats the air which is supplied to supply duct 46 through air conditioning coil 47 into the previously explained supply duct 46. The air conditioning system 53 is shown having a supply S and a return R even though the air conditioning coils 47 are not cooled during the heating season. The novel heat exchanger 51 is preferably made from a high heat conductivity metal such as aluminum and comprises a plurality of spaced plates sealed one from another to permit an efficient cross flow heat exchanger. Such heat exchangers made of aluminum are capable of operation as high 500+ degrees Fahrenheit in the preferred embodiment.

In this embodiment, a controller 59 preferably is capable of operating the inline blower motors 57 and 54 at predetermined speeds to achieve predetermined desired cubic foot displacements of make-up air and exhaust air in the system. For example, if motor 54 is run at a slower speed the exhaust gases in exhaust stack 11B increase in temperature. The exhaust motor 54 only needs to be operated to a speed which exhausts the desired amount of make-up air plus combustion air into the system. Similarly, the blower motor 57 only needs to supply the amount of fresh air needed for combustion and make-up. It is not intended that motors 54 and 57 be operated at variable speeds over a long period of time. It is preferred that the motors be set to operate at desired displacement speeds when the fireplace 60 is on and the blower in central air furnace 45 may be operated independently of the make-up system which passes through the fireplace.

Figure 7:
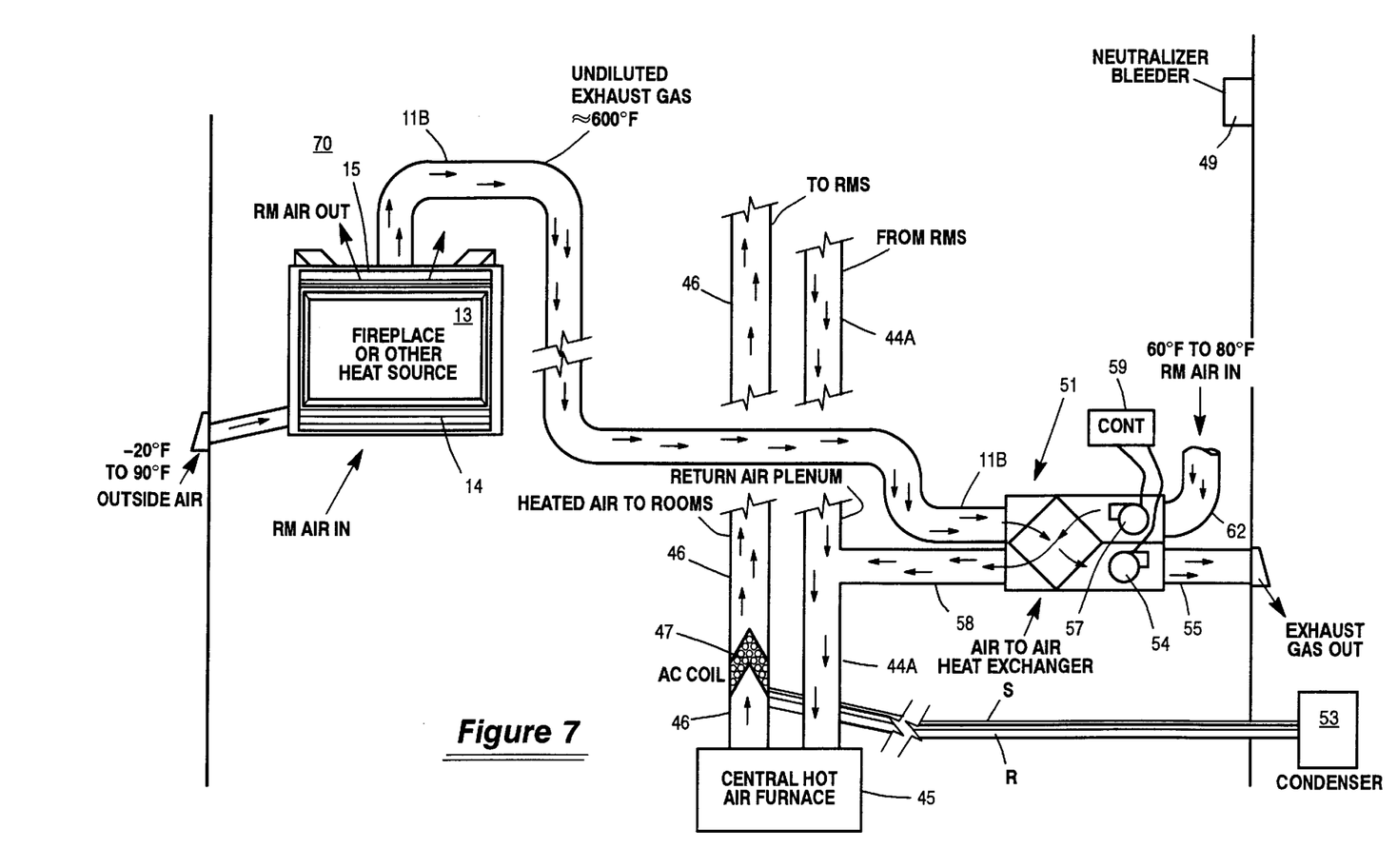
FIG. 7 is a diagrammatic drawing in elevation of a co-linear fireplace adapted to pass its hot exhaust gases through a remote heat exchanger used to heat room air in a house as it passes into the return air duct of a central heating system.

Refer now to FIG. 7 showing a diagrammatic drawing in elevation of a co-linear fireplace 70 adapted to pass its exhaust gases through the aforementioned novel air-to-air cross flow heat exchanger 51. When the fireplace 70 is on, it takes outside fresh air in through duct 61 and burns the air in the combustion chamber 13 and passes the undiluted exhaust gas into exhaust duct 11B at approximately 600 degrees Fahrenheit where it cools on its passageway to the novel cross flow heat exchanger 51. The exhaust gases pass through the in-line blower 54 and are exhausted through exhaust duct 55 to the outside. In this embodiment, the blower 57 sucks in air from the house at 60 to 80 degrees Fahrenheit and passes it into the return duct 58 after being preheated in the heat exchanger 51. The preheated house air is passed into the central hot air furnace 45 where it is heated again and forced into the supply duct 46 by air conditioning coils 47 and into the rooms.

In the preferred embodiment of this invention, it may be possible to control the blower motor 57 in a manner where it creates a negative pressure in a room or area in which it is located so that either the bleeder 49 or leaks in a loose house supply the sufficient make-up air desired for air quality. However, if the house is new and of tight construction it could be necessary to place a remote heat pump in the system as shown and described in FIGS. 4 and 5 in order to supply the deficiency of make-up air for quality air conditions. Blower 54 acts to induce outside combustion air into combustion chamber 13.

Having explained a preferred embodiment of the present invention and modifications thereof, it will be understood that presently designed and manufactured high production fireplaces may be coupled into existing heating systems in homes that have forced air furnaces so as to create not only an efficient heating system, but a system which supplies make-up air for a quality air system in a very efficient manner. The preferred embodiment of the present invention is provided with variable speed motors and controls which allow the installers of such systems to use universal equipment to achieve precise and exacting predetermined standards for different types of houses made to different tightnesses and specifications. Thus, the present invention permits a builder of houses to select universal components that are produced at high efficiency and low cost for installation without having to engineer and manufacture a custom system.

Having explained the problem of maintaining heat efficiency in tight houses having hot air fireplaces and hot air furnaces, it will be appreciated that the introduction of a required amount of cold outside air to maintain air quality can decidedly reduce the heat efficiency of the fireplace and/or the heating system. Accordingly, there is provided a high efficiency heat exchange system that preheats the fresh air using the hot exhaust gas from a gas fireplace and/or the fireplace heat exchanger is employed to preheat the air without unbalancing the temperature of the rooms or the system. The outside fresh air is preheated in a manner which will permit easy modification of existing combined fireplace and furnace systems as well as the installation of the present novel system in new homes.

What is claimed is:

1. A method of supplying pre-heated outside make-up quality air to a home having a fireplace and furnace system, comprising the steps of:

generating heat of combustion in said fireplace as combustion products, conducting said combustion products into an exhaust duct, passing said combustion products in said exhaust duct through a remote heat exchanger means and then to an outside area, passing outside make-up quality air through said heat exchanger means to remove heat from said combustion products and provide preheated quality air, conducting said preheated quality air into a return or supply duct system of said furnace, and supplying said preheated quality air to rooms in said home.

2. The method as set forth in claim 1 which further includes the step of removing room air mixed with quality air from the home by burning room air.

3. The method as set forth in claim 1 which further includes the steps of pumping outside fresh quality air into said home at a point remote from said fireplace, and neutralizing the pressure in said home at a second remote point.

4. The method as set forth in claim 1 which further includes conducting outside unheated fresh air into a combustion chamber of the fireplace during the step of conducting said combustion products into an exhaust duct.

5. The method as set forth in claim 4 which comprises connecting said exhaust duct to said remote heat exchanger means.

6. The method as set forth in claim 4 wherein said exhaust duct comprises a coaxial exhaust duct directing combustion products to an outside source.

7. The method as set forth in claim 6 which includes a heat exchanger in said fireplace and an exhaust duct is connected to said heat fireplace exchanger and to said return or supply duct system of said furnace.

8. A method of supplying preheated outside make-up quality air to a home having both a fireplace and a furnace system comprising the steps of:

providing a remote heat exchanger outside of said fireplace and said furnace system, connecting an outside air intake duct through said remote heat exchanger and into a return supply duct of said furnace system, connecting an exhaust duct from said fireplace through said remote heat exchanger and to the outside atmosphere, whereby said outside air in said outside air intake duct is preheated in said remote heat exchanger before entering the return supply duct of said furnace system.

9. The method as set forth in claim 8 wherein said exhaust duct comprises an exhaust gas duct connected to the combustion chamber of said fireplace for conducting hot exhaust gas from said fireplace through said remote heat exchanger.

10. The method as set forth in claim 9 wherein said exhaust duct comprises a hot air duct connected to the fireplace heat exchanger for conducting heated room air into the return supply duct of said furnace system.

11. The method as set forth in claim 8 which further comprises providing control means for regulating the amount of outside fresh air being introduced into the return duct of said furnace system.

* * * * *